US010152427B2

(12) United States Patent
Coburn et al.

(10) Patent No.: US 10,152,427 B2
(45) Date of Patent: Dec. 11, 2018

(54) HYBRID MEMORY MANAGEMENT

(71) Applicant: Google LLC, Mountain View, CA (US)

(72) Inventors: Joel Dylan Coburn, Mountain View, CA (US); Albert Borchers, Aptos, CA (US); Christopher Lyle Johnson, San Francisco, CA (US); Robert S. Sprinkle, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/235,495

(22) Filed: Aug. 12, 2016

(65) Prior Publication Data
US 2018/0046378 A1 Feb. 15, 2018

(51) Int. Cl.
G06F 12/10 (2016.01)
G06F 12/1009 (2016.01)
G06F 12/121 (2016.01)

(52) U.S. Cl.
CPC ........ *G06F 12/1009* (2013.01); *G06F 12/121* (2013.01); *G06F 2212/1024* (2013.01);
(Continued)

(58) Field of Classification Search
CPC ...... G06F 3/0605; G06F 3/061; G06F 3/0611; G06F 3/0619; G06F 3/064; G06F 3/0647; G06F 3/0659; G06F 3/0665; G06F 3/0673; G06F 3/0683; G06F 3/0685; G06F 12/1009; G06F 12/122; G06F 12/124; G06F 2212/1024; G06F 2212/1032; G06F 2212/152
(Continued)

(56) References Cited

U.S. PATENT DOCUMENTS 5,361,345 A 11/1994 English
5,432,917 A 7/1995 Parikh
(Continued)

FOREIGN PATENT DOCUMENTS

EP 0731944 9/1996
JP S61-059557 A 3/1986
(Continued)

OTHER PUBLICATIONS

Badam et al., "Better flash access via shape-shifting virtual memory pages," Proceedings of the First ACM SIGOPS Conference on Timely Results in Operating Systems. ACM, 2013, 14 pages.
(Continued)

*Primary Examiner* — Gary J Portka
(74) *Attorney, Agent, or Firm* — Fish & Richardson P.C.

(57) ABSTRACT

Methods, systems, and apparatus for determining whether an access bit is set for each page table entry of a page table based on a scan of the page table with at least one page table walker, the access bit indicating whether a page associated with the page table entry was accessed in a last scan period; incrementing a count for each page in response to determining that the access bit is set for the page table entry associated with the page; resetting the access bit after determining whether the access bit is set for each page table entry; receiving a request to access, from a main memory, a first page of data; initiating a page fault based on determining that the first page of data is not stored in the main memory; and servicing the page fault with a DMA engine.

20 Claims, 6 Drawing Sheets

(52) U.S. Cl.
CPC ............... *G06F 2212/1032* (2013.01); *G06F 2212/152* (2013.01); *G06F 2212/657* (2013.01)

(58) Field of Classification Search
USPC .................. 711/156, 159, 206, 208, 209
See application file for complete search history.

(56) References Cited

U.S. PATENT DOCUMENTS

| | | | |
|---|---|---|---|
| 5,493,663 A * | 2/1996 | Parikh .................. | G06F 12/123 711/159 |
| 6,029,224 A | 2/2000 | Asthana et al. | |
| 6,671,791 B1 * | 12/2003 | McGrath ............ | G06F 12/1009 711/206 |
| 6,804,729 B2 | 10/2004 | Swanberg | |
| 8,832,353 B2 | 9/2014 | Hsu | |
| 2003/0154348 A1 | 8/2003 | Keltcher et al. | |
| 2007/0300012 A1 | 12/2007 | Yip | |
| 2009/0031088 A1 | 1/2009 | Donley | |
| 2009/0307459 A1 | 12/2009 | Fleming et al. | |
| 2011/0271070 A1 | 11/2011 | Worthington et al. | |
| 2014/0281299 A1 | 9/2014 | Duluk et al. | |
| 2014/0281356 A1 * | 9/2014 | Buschardt .......... | G06F 12/1009 711/206 |
| 2015/0058522 A1 | 2/2015 | Armstrong et al. | |
| 2015/0199126 A1 | 7/2015 | Jayasena et al. | |
| 2016/0055098 A1 | 2/2016 | Wang | |
| 2017/0177482 A1 | 6/2017 | Greenspan | |

FOREIGN PATENT DOCUMENTS

| | | |
|---|---|---|
| JP | H04-007653 A | 1/1992 |
| JP | H05-241958 A | 9/1993 |
| JP | H06-083713 A | 3/1994 |
| JP | 2005-216053 A | 8/2005 |
| JP | 2011-165093 A | 8/2011 |
| TW | 200401187 | 1/2004 |
| TW | 200705452 | 2/2007 |

OTHER PUBLICATIONS

Gorman, Mel, "Understanding the Linux virtual memory manager," Upper Saddle River: Prentice Hall, Jul. 2004, 731 pages.
Partial European Search Report issued in European Application No. 17185832.7, dated Jan. 16, 2018, 17 pages.
Extended European Search Report issued in European Application No. 17185833.5 dated Dec. 12, 2017, 8 pages.
Extended European Search Report issued in European Application No. 17185832.7, dated May 2, 2018, 14 pages.
Office Action issued in Taiwanese Application No. 106127201, dated May 8, 2018, 19 pages (with English translation).
Office Action issued in Japanese Application No. 2017-156543, dated Sep. 5, 2018, 6 pages (Machine Translation Only).
Office Action issued in European Application No. 17185833.5, dated Sep. 11, 2018, 8 pages.

* cited by examiner

HYBRID MEMORY MANAGEMENT

FIELD

The present specification generally relates to memory systems.

BACKGROUND

A wide variety of memory devices can be used to maintain and store data and instructions for various computers and similar systems. In conventional computing systems, Dynamic Random Access Memory (DRAM) technology has typically been employed to operate the dynamic memory of the computer in order for an application to operate at high speeds. However, DRAM used as main memory in computer systems is no longer scaling as rapidly as in the past. As a result, DRAM storage has become a limited resource in computing environments.

A second tier of memory, such as non-volatile memory, may be used, which bridges the performance gap between DRAM and slower technologies such as NAND flash. The second tier of memory may be accessed locally over a memory or IO bus, or remotely over a high-speed network. However, applications need to explicitly manage data placement or the system must provide automatic management that transparently moves data between memory tiers. Thus, new techniques are needed for automatic management with minimal performance impact to overcome the inadequacies of existing techniques that were designed for slower storage devices.

SUMMARY

One innovative aspect of the subject matter described in this specification is embodied in systems and methods that include determining, with a processor, whether an access bit is set for each page table entry of a page table based on a scan of the page table with at least one page table walker of the processor, the access bit indicating whether a page associated with the page table entry was accessed in a last scan period; incrementing a count for each page in response to determining that the access bit is not set for the page table entry associated with the page; after determining, with the processor, whether the access bit is set for each page table entry, resetting the access bit; receiving a request to access, from a main memory, a first page of data; initiating a page fault based on determining that the first page of data is not stored in the main memory; and servicing the page fault using a direct memory access (DMA) engine.

In certain implementations, servicing the page fault using a DMA engine includes, if the main memory cannot receive a page transfer, determining one of a least used pages based on the count for each page and releasing the one of the least used pages into the secondary memory, and transferring the first page data from the secondary memory to the main memory at the location of the released one of the least used pages; and if the main memory can receive a page transfer, transferring the first page data from the secondary memory to the main memory.

In certain implementations, initiating the page fault includes stalling execution of a thread while the page fault is serviced; and releasing the thread to access the main memory after the page fault is serviced. Further, in certain implementations, the count for each page is maintained by at least one of: a counter for each page stored in static random access memory, counting bloom filters, or a counter for each page stored in dynamic random access memory.

One innovative aspect of the subject matter described in this specification is embodied in systems and methods that include determining whether an access bit is set for each page table entry of a page table based on a scan of the page table with at least one page table walker, the access bit indicating whether a page associated with the page table entry was accessed at a main memory in a last scan period; incrementing a primary count for each page in the main memory in response to determining that the access bit is not set for the page table entry associated with the page; after determining whether the access bit is set for each page table entry, resetting the access bit; determining whether a page in a secondary memory is accessed based on a home agent receiving a request to access the page in the secondary memory; incrementing a secondary count for each page in the secondary memory in response to determining that the page in the secondary memory is accessed based on the home agent receiving a request to access the page in the secondary memory; identifying a particular page in the secondary memory as frequently accessed based on the secondary count; and migrating the particular page identified as frequently accessed from the secondary memory to the main memory Another aspect of the subject matter described in this specification may be embodied in systems and methods that include identifying a certain page in the main memory as infrequently accessed based on the primary count; and migrating the certain page identified as infrequently accessed from the main memory to the secondary memory. In addition, migrating the certain page identified as infrequently accessed includes invalidating the page table entry associated with the certain page, executing a translation lookaside buffer shootdown for any entries associated with the certain page, and transferring the certain page from the main memory to the secondary memory.

In certain implementations, each of the primary count for each page in the main memory and the secondary count for each page in the secondary memory is maintained by at least one of: a counter for each page stored in static random access memory, counting bloom filters, or a counter for each page stored in dynamic random access memory.

In certain implementations, identifying a certain page in the main memory as infrequently accessed based on the primary count includes determining that an inter-access time for the certain page satisfies an inter-access time threshold. In addition, in certain implementations, the certain page identified as infrequently accessed is migrated from the main memory to the secondary memory in response to determining that the inter-access time for the certain page satisfies the inter-access time threshold.

Other embodiments of these aspects include corresponding systems, apparatus, and computer programs, configured to perform the actions of the methods, encoded on computer storage devices.

Particular embodiments of the subject matter described in this specification can be implemented so as to realize one or more of the following advantages. For example, the usage or access statistics for pages in memory determined by hardware may be more precise and accurate than current methods involving software and sampling techniques. Further, by transferring a particular cache line for which access is requested first, rather than the full page of data, the delay caused by transferring a page in response to a request to access the page may be reduced, which may result in faster execution of the application or process being executed.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

New non-volatile memory technologies may be accessed locally over a memory or IO bus, or remotely over a high-speed network. The performance of these technologies has two significant implications: first, they are fast enough that software overheads to access them must be minimal; and second, they are slow enough that DRAM may typically be used as a cache. To capitalize on the advantages of these types of non-volatile memory, applications need to explicitly manage data placement or the system must provide automatic management that transparently moves data between different portions of memory.

Accordingly, embodiments of the present disclosure provide a system for high-performance automatic management of a secondary memory available either locally over a memory or IO bus, or remotely over a network. The secondary memory may be computer memory that is non-volatile and persistent in nature. The secondary memory may not be directly accessed by the processor and may be slower than the primary or main memory. The main memory, also referred to as primary memory, primary storage, internal memory or first-tier memory, may be directly accessible to the CPU. As described in more detail below, hardware utilizes the cache coherence protocol and interconnect in modern processor-based systems to reduce access latencies and maintain consistency. In addition, an optimized kernel driver, for example, may provide a fast path to the second tier of memory and handle all communication with the memory management hardware. That process is advantageous compared to existing paths through the kernel for paging, which incur large costs for things like synchronization, memory management, and block IO transfers.

These features and additional features are described in more detail below.

Figure 1:
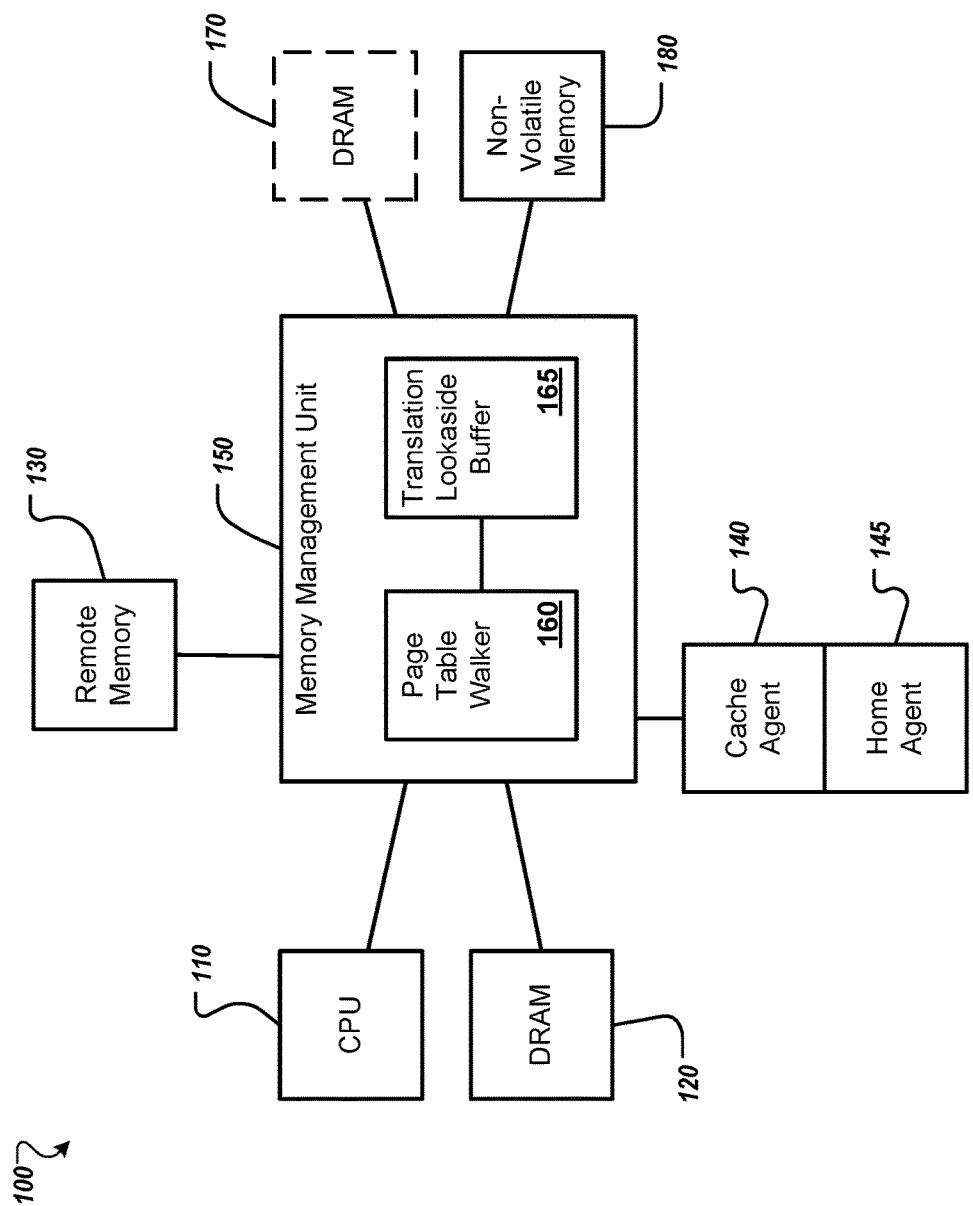
FIG. 1 depicts an example of a system including a memory device according to implementations of the present disclosure.

FIG. 1 depicts an example of a system 100 including a memory device according to implementations of the present disclosure. A central processing unit (CPU) 110 may be in communication with a DRAM 120 and a memory management unit (MMU) 150. The system 100 may further include remote memory 130, which may be accessed over a network. A cache agent 140 and a home agent 145 may operate along with MMU 150 in the management of memory. The term cache agent refers to a processing unit agent that stores cache data and can initiate memory requests. In other words, the term cache agent may represent an entity which may initiate transactions into coherent memory, and which may retain copies in its own cache structure. The home agent 145 may be, for example, a memory controller. The term home agent refers to a processing unit agent that supervises or owns a region or portion of memory. In other words, the term home agent may represent an entity which services coherent transactions, supervises a portion of the coherent memory, and/or manages conflicts that may arise among different cache agents. In addition, a page table walker 160 and a translation lookaside buffer (TLB) 165 may be part of or implemented with MMU 150.

The MMU 150 is a hardware unit that may have memory references passed through it, performing the translation of virtual memory addresses to physical addresses and handling cache control. For example, the MMU 150 may use a page table as an in-memory table containing one page table entry (PTE) per page, to map virtual page numbers to physical page numbers in main memory. The translation lookaside buffer 165, as an associative cache of PTEs, may be used to avoid the necessity of accessing the main memory every time a virtual address is mapped. When a PTE prohibits access to a virtual page, for example because no physical random access memory has been allocated to that virtual page, the MMU 150 may signal a page fault to the CPU 110. Referring to FIG. 1, the system 100 may additionally include non-volatile memory 180, and may optionally include private DRAM 170.

Figure 2:
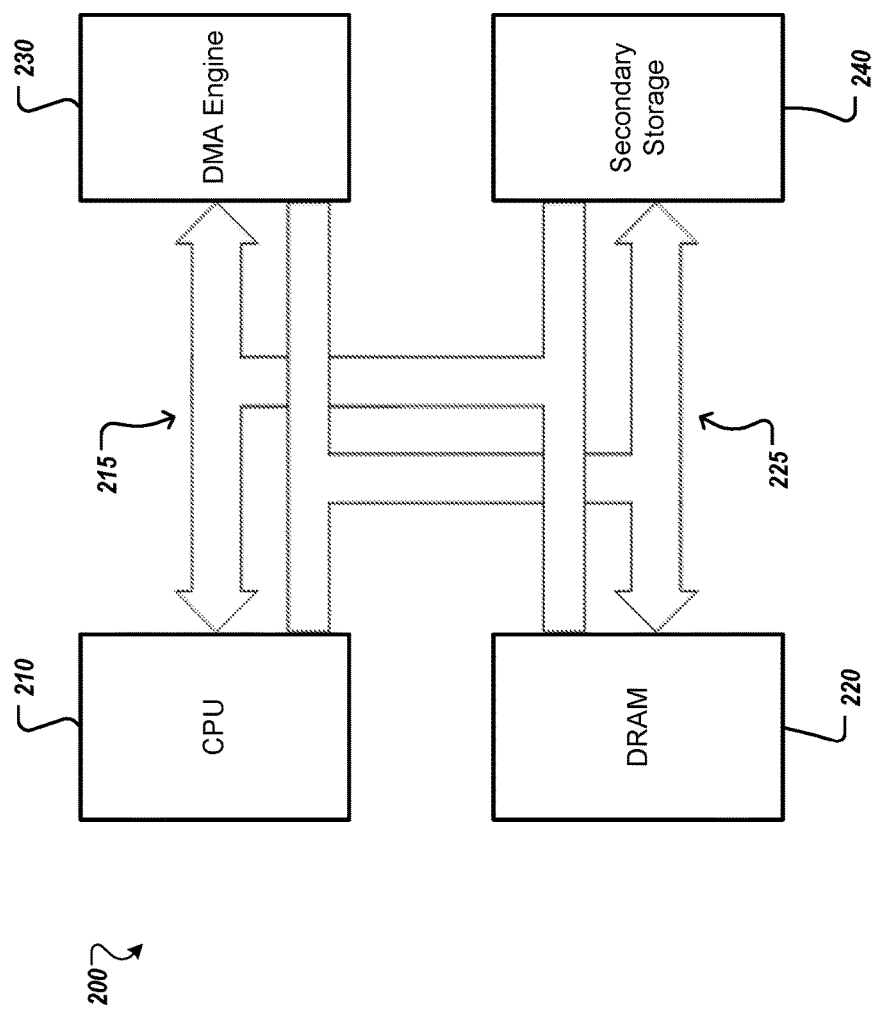
FIG. 2 depicts an example of a system including a memory device according to implementations of the present disclosure.

FIG. 2 depicts an example of a system 200 including a memory device according to implementations of the present disclosure. The system 200 may include a CPU 210 and a DRAM 220. The system 200 may further include a direct memory access (DMA) engine 230 and a secondary storage 240. The CPU 210, DRAM 220, DMA engine 230, and secondary storage 240 may be in data communication via one or more busses 215, 225, or other means of data communication.

In operation, the DMA engine 230 may be used for servicing page faults, handling write backs, or page migration. The secondary storage 240 may be a memory device serving as second-tier memory, which may not be directly accessed by the CPU 210. The DMA engine 230 may be directly connected to CPU 210 or may be part of separate entity such as a cache agent. When the CPU 210 attempts to access a page from the DRAM 220, as main memory, i.e., first-tier memory or primary memory, and that page is paged out and exists in the secondary storage 240, a page fault may occur. The page fault may indicate that the operating system (OS) needs to move the page from the secondary storage 240 to the main memory, DRAM 220. According to embodiments described herein, the hardware DMA engine 230 manages the page fault, detecting the attempt to access the page that is not in main memory DRAM 220. In response, the execution of the thread stalls while the page fault is serviced. The thread may then be released to access the main memory DRAM 220 and continue execution.

In that manner, hardware may initiate the page transfer by servicing page faults using the DMA engine 230. Accordingly, there is a programmable DMA engine 230 to accelerate page transfers in servicing page faults, writing back dirty pages, and migrating pages. The DMA engine 230 may manage the servicing of multiple concurrent requests. The DMA engine 230 requests may be initiated and completed using a low overhead command and response interface over a coherent interconnect, which may be an interconnect for the shared memory. The DMA engine 230 may be configured to be a user of coherent memory, employing a memory coherence protocol, so that the DMA engine 230 may transfer data directly into the last-level cache of the processor or CPU 210.

Figure 3:
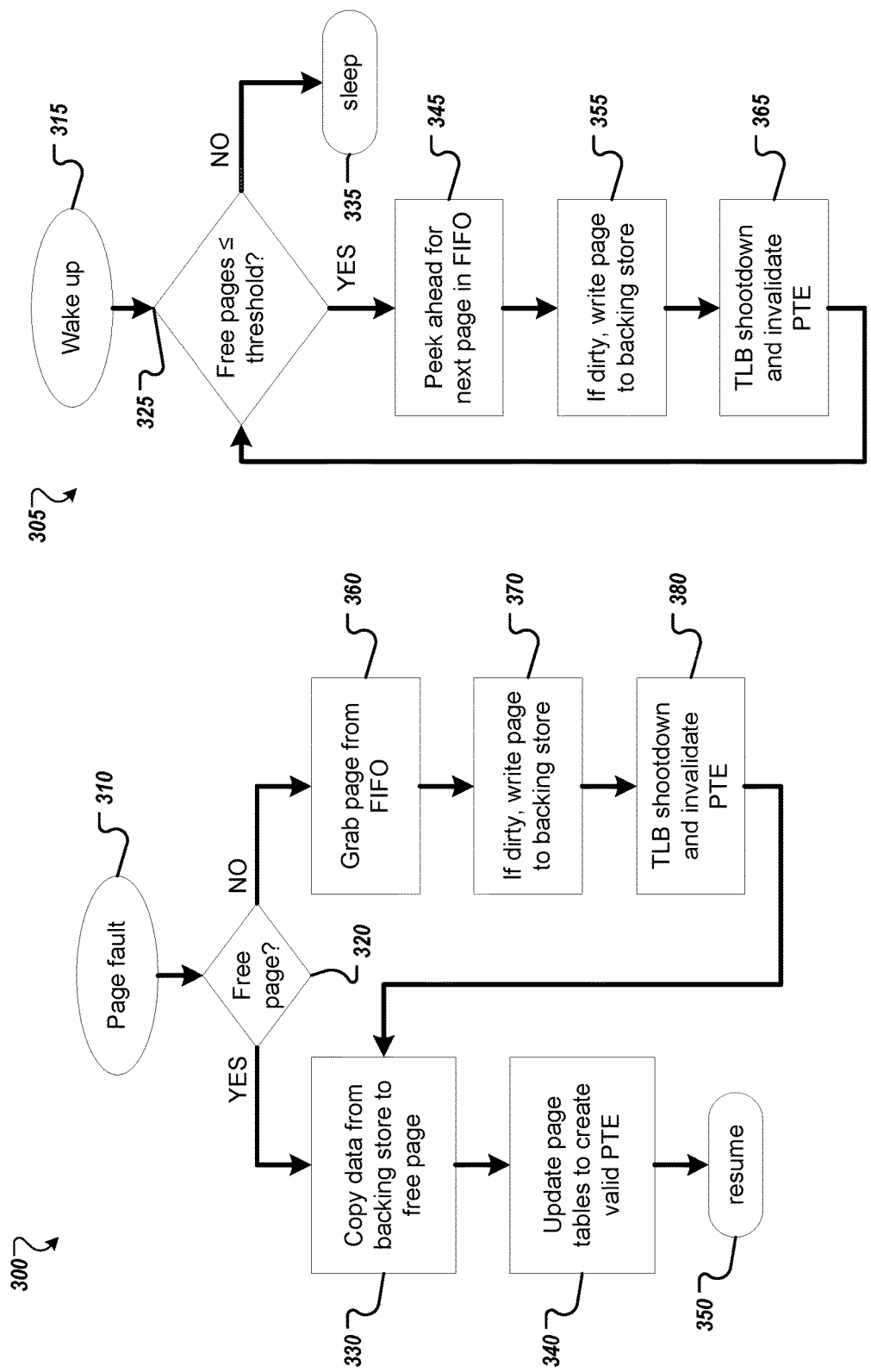
FIG. 3A depicts a flowchart of an example of a process for handling a page fault according to implementations of the present disclosure.
FIG. 3B depicts a flowchart of an example of a process for a write back thread according to implementations of the present disclosure.

FIG. 3A depicts a flowchart of an example of a process 300 for handling a page fault according to implementations of the present disclosure. As described above, a page fault may occur when a thread or running program accesses a memory page that is mapped into the virtual address space, but not actually loaded into main memory. The processor's MMU 150 may detect the page fault. When the page fault is detected at 310, a determination may be made at 320 as to whether there is a free page. If there is a free page, "yes", page data may be copied from the secondary storage or backing store to the free page location at 330. If there is not a free page, "no", a page may be pulled, at 360, from the FIFO queue, which may track all the pages in memory in a queue, with the most recent arrival at the back, and the oldest arrival in front. If that page is dirty, i.e., has been modified, at 370 the system may write the page to the secondary memory or backing store. In transferring the page from the main memory to the secondary memory, at 380 the page table entry associated with the page may be invalidated, and a TLB shootdown for any entries associated with the page may be executed, e.g., causing the TLB entries to be flushed for other processors. With that page now free, page data may be copied from the secondary storage or backing store to the free page location at 330. The page tables may be updated at 340 to create a valid PTE by updating the PTE associated with the page to point to the location in the main memory of the page. Once the page fault is handled, the thread or running program may resume at 350.

FIG. 3B depicts a flowchart of an example of a process 305 for a write back thread according to implementations of the present disclosure. Upon wake up at 315, a determination may be made as to whether the number of free pages satisfy a threshold number of pages, which may be any number of pages the given architecture is configured to handle. For example, at 325, a determination may be made as to whether the number of free pages is less than or equal to a threshold. If the number of free pages does not satisfy the threshold ("no"), e.g., is greater than the threshold, the thread may sleep at 335. If, however, it is determined at 325 that the number of free pages satisfies the threshold ("yes"), the system may determine the next page in the FIFO queue at 345. If that page is dirty, i.e., has been modified, at 370 the system may write the page to the secondary memory or backing store. In transferring the page from the main memory to the secondary memory, at 380 the page table entry associated with the page may be invalidated, and a TLB shootdown for any entries associated with the page may be executed. With that page now free, a determination may once again be made as to whether the number of free pages satisfy the threshold at 325.

Page table scanning, i.e., a scan through the page table, may be performed via hardware, rather than software requiring CPU overhead, which often results in slower memory access and processing and discarding some otherwise useful cache information. In general, the frequency of access of page data, e.g., which page data is frequently accessed relative to other pages of data and which page data is infrequently accessed relative to other pages of data may be determined by scanning the page table. Each page mapped in the page table, e.g., each PTE, may have a flag or access bit that may be set whenever the page is accessed, and then cleared by the CPU after scanning the page table.

This hardware may be implemented by augmenting the page table walker or MMU, which may include one or more page table walkers, e.g., built-in hardware to read the page table and automatically load virtual-to-physical translations into the TLB. Thus, the hardware may be part of the processor architecture, using the page table scanning mechanism in the processor. For example, the hardware may implement a routine to scan through a page table, scanning the PTEs, to determine if an access bit has been set at each PTE since the last scan. The access bit may be cleared after determining whether the access bit has been set, and then operations may proceed until the next scan of the page table. The scanning may occur periodically, e.g., with a predetermined time period between scans, or the scanning may be triggered by some external event. Each time it is determined that an access bit or flag is not set, a count may be incremented for each page, respectively.

Over time, a profile may be created from the scanning, and the profile indicates how often and/or how recently each page is accessed. For example, the hardware may include one or more counters for each page or bloom filters to maintain the usage statistics, e.g., the count of unset access bits or flags, or the results may be stored in memory, e.g., a two-level memory, to allow sorting and filtering, e.g., most and least used pages or more frequently and less frequently accessed pages. In more detail, the hardware may maintain a per-page counter to determine how recently a page was accessed, and each counter may be updated when the respective PTE is scanned. The per-page counters may be provided in on-chip SRAM for fast access. Alternatively, because the size of the secondary memory may be large, making the area cost of the counters higher, counting bloom filters may be used to maintain the access statistics about sets of pages, thereby saving area. Alternatively, the hardware may use a small amount of private DRAM or may store the counters in system DRAM.

In certain embodiments, the page table scanning to collect access statistics may be implemented with a hardware module contained in or tightly coupled with the page table walker of the processor, or may be implemented in the MMU, since the MMU may have one or more page table walkers already available to IO devices. Accordingly, as described above, that hardware may scan the page tables and may use the access bit of each PTE to determine each the age of each page based on determining whether the access bit has been set since the last scan. For example, if the access bit is set, then the page was accessed within the last scan period; otherwise if the access bit is not set, it is has not been accessed and may be considered cold, e.g., not accessed during the last scan period. Advantageously, these usage or access statistics determined by hardware may be more precise and accurate than current methods involving software and sampling techniques.

Thus, for main memory, the number of times the access bit has not been set may be counted for each page to identify cold pages, where, for example, the higher the count for a page, the colder the page is. The count may be reset to zero when the page is accessed and the access bit is set. The page tables may be scanned periodically to detect changes to the access bit, and all access bits may be cleared on each scan. Thus, the count may represent the age of the page, i.e., how long the page has gone un-accessed.

As described above, the DMA engine 230 may be used in servicing page faults. In certain embodiments, the access statistics may be used to determine the destination of a page transfer or to determine a policy that may be implemented to identify which pages to transfer and when to transfer those pages. For example, based on the access statistics, the pages may be ordered from most used to least used or vice versa. When the page fault is serviced using the DMA engine 230, if there are no free pages in main memory DRAM 220, a hardware-assisted paging process may release or write back one of the least used pages into the secondary memory and may use the location of that least used page to transfer the new page into main memory.

Figure 4:
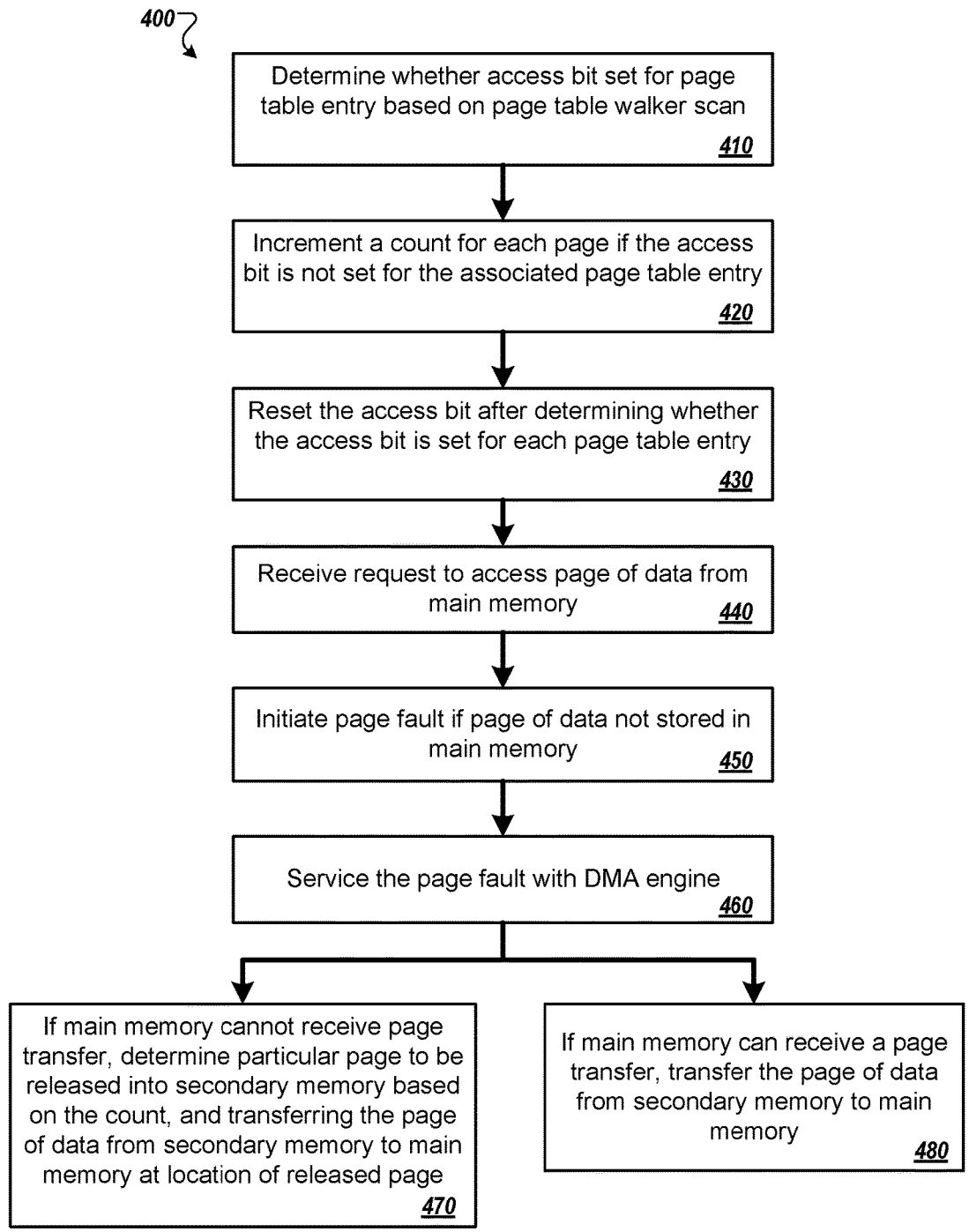
FIG. 4 depicts a flowchart of an example of a process for determining a frequency of usage of a page with hardware and servicing a page fault using a DMA engine, according to implementations of the present disclosure.

FIG. 4 depicts a flowchart of an example of a process 400 for determining a frequency of usage of a page with hardware and servicing a page fault using a DMA engine, according to implementations of the present disclosure. The process 400 includes, at 410, determining, using the processor, whether an access bit is set for each PTE of a page table based on a scan of the page table with a page table scanner. For, example, at least one page table walker of the processor may be modified to scan the page table for whether the access bit is set. For example, a thread may be added to the page table walker to scan the page table or the scanning may be done by hardware separately from the page table walker. The access bit may indicate whether a page associated with the PTE was accessed within the last scan period, e.g., between the last scan and the current scan of the page table.

At 420, a count for each page may be incremented in response to determining that the access bit is not set for the PTE associated with the page. After determining whether the access bit is set for each PTE, at 430, the processor may reset the access bit. The count for each page may be maintained by a counter for each page stored in static random access memory or counting bloom filters may maintain the access statistics about sets of pages. Alternatively, a counter for each page may be stored in dynamic random access memory, e.g., a small amount of private DRAM or in system DRAM.

The process 400 may further include, at 440, receiving a request to access a page of data from the main memory. At 450, a page fault may be initiated based on determining that the page of data, for which access is requested, is not stored in the main memory. At 460, a page fault handler may detect the page fault and may service the page fault using the DMA engine 230.

For example, if the main memory does not have a free page and cannot receive the page transfer, a particular page in main memory, e.g., one of the least used pages in main memory, may be determined based on the count for each page at 470. The DMA engine 230 may manage the page transfer and the determined one of the pages may be released or written back into the secondary memory at 470. Further, at 470, the page of data for which access is requested may be transferred from the secondary memory to the main memory at the location of the released one of the least used pages. Alternatively, if the main memory does have a free page and can receive the page transfer, the DMA engine 230 may manage transferring of the page data from the secondary memory to the main memory at 480.

In certain embodiments, when the page fault is initiated, execution of the thread or running program may be stalled while the DMA engine 230 manages data transfer to service the page fault, as described above. The thread may be released to access the page in the main memory after the page fault is services.

Rather than an IO request to access data and initiating a page fault to transfer page data from the secondary memory, in some systems, the secondary memory may be accessed directly by the processor with loads and stores, using page migration. In these systems, data may not need to be accessed at page granularity. However, it may be beneficial to take advantage of the usage or access statistics described above to migrate data automatically based on whether the data is "hot" or "cold", i.e., how recently accessed, how frequently access, or the likelihood of accessing again.

In general, utilizing features of a cache coherence architecture, in which data in the secondary memory may be associated with a home agent 145 that is responsible for a region of the physical address space, e.g., all secondary memory in the region, the home agent 145 may identify every access to the memory for which the home agent is responsible and may use that identification to maintain access statistics. The home agent 145 associated with secondary memory may maintain data about which pages are being accessed and when those pages are being accessed. Based on the frequency of access, e.g., if the frequency of access satisfies a threshold, the home agent 145 may determine that the data accessed frequently may be transferred from the secondary memory to the main memory DRAM 120.

To perform that migration, it is advantageous to determine not only which pages in the secondary memory are getting "hot", i.e., an increase in frequency of access, but also to determine which pages in main memory DRAM are getting "cold", i.e., a decrease in frequently of access. In other words, determining which pages are accessed more frequently in the secondary memory, which may be slower than the main memory, and which pages are accessed less frequently in the main memory. One process to determine which pages are accessed less frequently in the main memory is described above with reference to usage or access statistics for the main memory DRAM based on, for example, a count of the access bit being unset. The system may determine when to move data from main memory DRAM to secondary memory and when to move data from secondary memory to main memory DRAM based on the access statistics described above for the main memory and taking advantage of the home agent tied to secondary memory to determine access statistics for the secondary memory.

Thus, the hardware may determine when to migrate pages between the main memory, e.g., DRAM 220, and the secondary memory, e.g., secondary storage 240. For example, the hardware may use a combination of cache coherence messages with the home agent and PTEs with the access bit to determine the "temperature" of data, i.e., how "hot" or frequently accessed and how "cold" or infrequently accessed certain data is, respectively. Accordingly, pages that have a rate of increasing access frequency are migrated from the secondary memory to main memory. As described above, those pages that are "warming" or being accessed more frequently may be determined by the hardware monitoring memory accesses to the secondary memory via the home agent detecting these accesses because the physical address range is owned by the home agent. Based on those determined accesses, a per-page access counter may be maintained, for example, in on-chip SRAM. Alternatively, because the size of the secondary memory may be large, making the hardware area cost of the counters higher, counting bloom filters may be used to maintain the access statistics about sets of pages, thereby saving area. Alternatively, the hardware may use a small amount of private DRAM or may store the counters in system DRAM.

In addition, as described in more detail above, pages that are cooling off or being accessed less frequently may be determined by monitoring the PTEs. For example, when the inter-access time for a page satisfies an inter-access time threshold, the system may initiate transfer of the page from main memory DRAM to the secondary memory by invalidating the PTE associated with the page, executing a TLB shootdown for any entries associated with the page, and transferring the page from main memory DRAM into the secondary memory.

Figure 5:
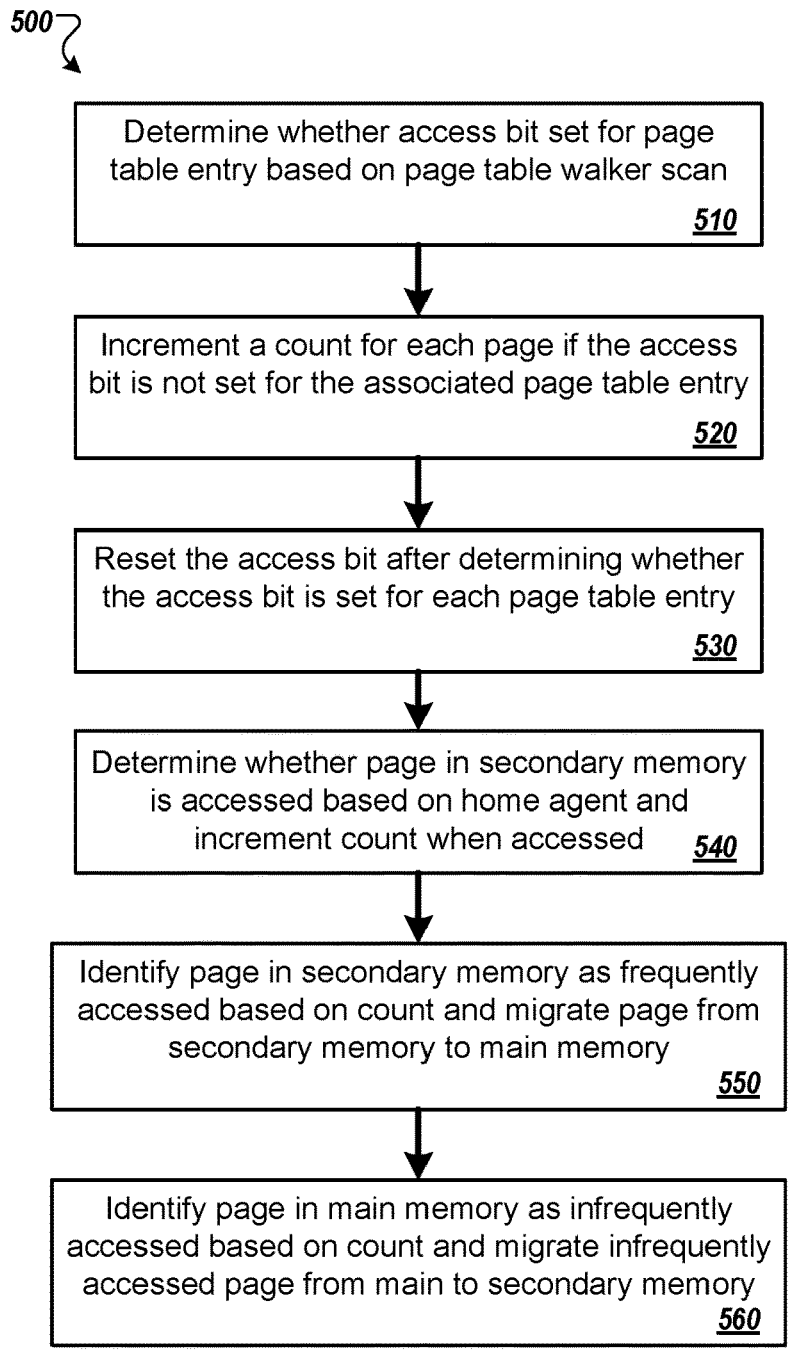
FIG. 5 depicts a flowchart of an example of a process for determining a frequency of usage of a page with hardware and performing page migration based on the determined usage, according to implementations of the present disclosure.

FIG. 5 depicts a flowchart of an example of a process 500 for determining a frequency of usage of a page with hardware and performing page migration based on the determined usage, according to implementations of the present disclosure. The process 500 includes, at 510, determining whether an access bit is set for each PTE of a page table based on a scan of the page table with a page table scanner of the processor. The access bit may indicate whether a page associated with the PTE was accessed within the last scan period, e.g., between the last scan and the current scan of the page table. At 520, a count for each page in the main memory may be incremented in response to determining that the access bit is not set for the PTE associated with the page. Alternatively, a count for each page in the main memory may be incremented in response to determining that the access bit is set for the PTE associated with the page. After determining whether the access bit is set for each PTE, at 530, the processor may reset the access bit. The count for each page in the main memory may be maintained by a counter for each page stored in static random access memory or counting bloom filters may maintain the access statistics about sets of pages. Alternatively, a counter for each page may be stored in dynamic random access memory, e.g., a small amount of private DRAM or in system DRAM.

The process 500 may further include, at 540, determining whether a page in a secondary memory is accessed based on a home agent receiving a request to access the page in the secondary memory. In addition, a count for each page in the secondary memory may be incremented, at 540, in response to determining that the page in the secondary memory is accessed based on the home agent receiving a request to access the page in the secondary memory. Based on that count, a page in the secondary memory may be identified, at 550, as frequently accessed. And that page identified as frequently accessed may be migrated from the secondary memory to the main memory at 550. In certain embodiments, groups of pages or portions of memory may be identified as frequently accessed and migrated from the secondary memory to the main memory.

The process 500 may further include, at 560, identifying a page in the main memory as infrequently accessed based on the count for each page in the main memory. That page identified as infrequently accessed may be migrated from the main memory to the secondary memory at 560. In certain embodiments, groups of pages or portions of memory may be identified as infrequently accessed and migrated from the main memory to the secondary memory. Identifying a page in the main memory as infrequently accessed based on the count at 560 may include determining that an inter-access time, i.e., a time between accesses, for the page satisfies an inter-access time threshold, e.g., the inter-access time for the page is greater than, or greater than or equal to, an inter-access time threshold. Thus, the page or group of pages identified as infrequently accessed may be migrated from the main memory to the secondary memory in response to determining that the inter-access time for the page or group of pages satisfies the inter-access time threshold.

The process of migrating the page identified as infrequently accessed at 560 may include invalidating the PTE or PTEs associated with the page or group of pages, executing a translation lookaside buffer shootdown for any entries associated with the page or group of pages, and transferring the page or group of pages from the main memory to the secondary memory. The count for each page in the secondary memory may be maintained by a counter for each page stored in static random access memory or counting bloom filters may maintain the access statistics about sets of pages. Alternatively, a counter for each page may be stored in dynamic random access memory, e.g., a small amount of private DRAM or in system DRAM.

As discussed above, when, for example, an application attempts to access memory, e.g., a page, and the page is not present in the main memory, a page fault occurs. The page fault may trigger a transfer of the whole page from the secondary memory to main memory DRAM and then the application may continue executing. However, that process may cause a delay while reading the data of the page. For example, for a 4 KB-sized page, the entire 4 KB may be transferred, which may cause a delay while reading the 4 KB of data. According to embodiments described herein, that delay may be advantageously reduced, which may result in faster execution of the application or process being executed.

Rather than transferring the entire page, e.g., the entire 4 KB in the above example, the system identifies which cache line, e.g., block of data, the application attempted to access and initially transfers only that cache line from secondary memory to main memory. With the cache line transferred for which access was requested, the application may perform its read or write of that data and continue running. After that critical cache line is transferred without transferring the entire page, the remaining portion of the page, e.g., the remaining portion of the 4 KB, may be transferred in the background.

In certain embodiments, the critical cache line may be provided to the CPU, and the cache coherency mechanism or protocol may be used. This process achieves faster performance for handling page faults. For example, in operation, an application may only request to access one or two cache lines from the page, and the critical cache lines may be provided without waiting for the entire page to be transferred. The remaining portion of the page may then be transferred in the background after the application is provided the requested data, e.g., the critical cache lines, to continue its execution.

Thus, by the hardware delivering the critical cache line first, the page fault latency may be decreased. The hardware may transfer the requested cache line from the secondary memory to, for example, the processor's cache and host DRAM. Accordingly, the requested data may be provided before the rest of the cache lines in the requested page are transferred. Further, for example, a custom page fault handler, or the hardware, may update the PTE to point to the new page in host DRAM. As a result, other processors may access cache lines in the page before those cache lines are actually present in main memory.

In certain embodiments, to maintain a consistent view of memory, the cache agent 140 may execute a request-for-ownership (RFO) on the cache lines in the page to hold them exclusively while the page transfer occurs. After the hardware finishes transferring a cache line, the cache agent 140 may release ownership of that cache line so that future requests may be serviced from the host's cache or host DRAM. Further, for example, when the host attempts to access one of the other cache lines in the page while the page is being transferred, the hardware may recognize a snoop request, e.g., an inter-processor cache coherency operation, for that other cache line in accordance with the cache coherence mechanism, and may provide the other cache line in response to the snoop request once the other cache line is transferred from the secondary memory.

In certain embodiments, the hardware may not actually store the cache lines for pages in transit in the cache agent's cache. Rather, the tags and coherence state bits for those lines may be stored, and then the data for a request from either the host DRAM or from slower memory may be forwarded. In either arrangement, the on-chip SRAM required to cache pages being transferred may be reduced.

Figure 6:
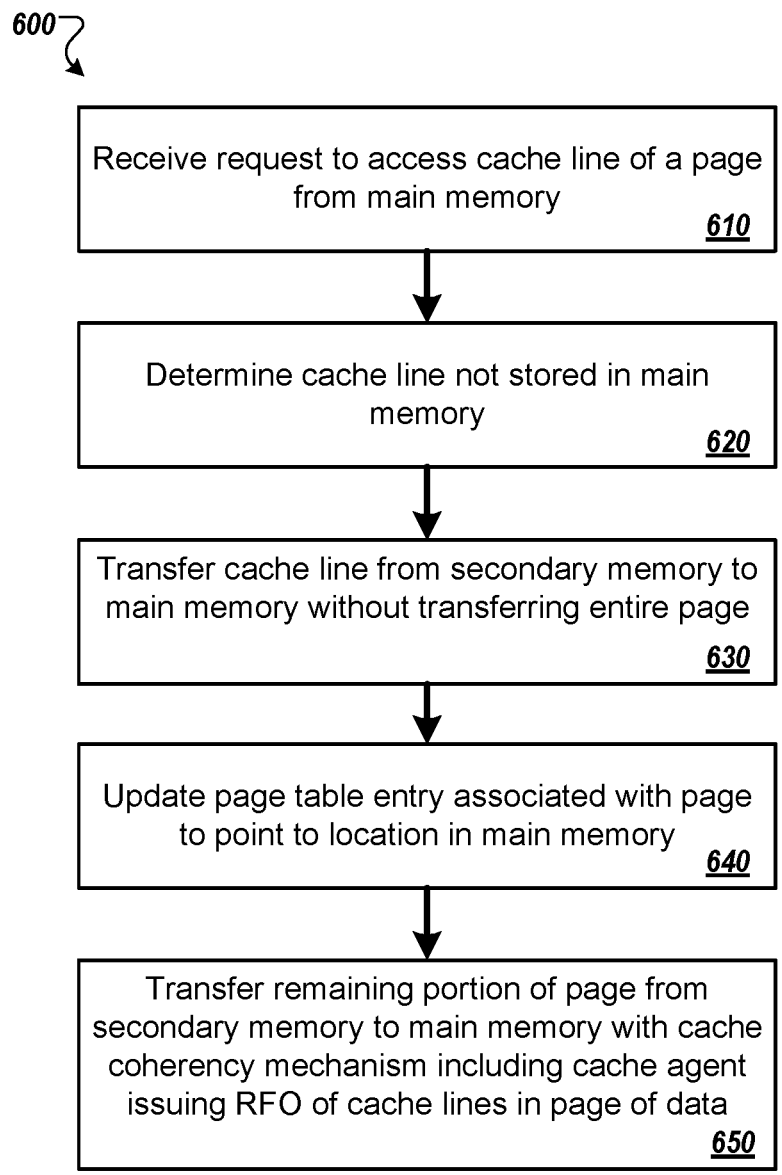
FIG. 6 depicts a flowchart of an example of a process for handling a page fault by transferring a critical cache line first, according to implementations of the present disclosure.

FIG. 6 depicts a flowchart of an example of a process 600 for handling a page fault by transferring a critical cache line first, according to implementations of the present disclosure. The process 600 may include, at 610, receiving a request to access a cache line of a page of data from a main memory. At 620, a determination may be made that the requested cache line is not stored in the main memory, but rather may be stored in secondary memory. The requested cache line, e.g., data block, of the page of data from the secondary memory may be transferred to the main memory, at 630, without transferring the entire page of data. Thus, the requested cache line is provided and the remaining portion of the page of data other than the requested cache line may remain stored in the secondary memory.

The process 600 may further include, at 640, updating a PTE associated with the page of data to point to a location of the page of data in the main memory. At 650, the remaining portion of the page of data may be transferred from the secondary memory to the main memory in the background after the requested cache line has been provided in response to the request to access the cache line.

In certain embodiments, a cache coherency mechanism may be implemented, while transferring the remaining portion of the page of data from the secondary memory to the main memory at 650, to service an access of a second cache line of the page of data different than the first cache line requested. The cache coherency mechanism may include issuing, by the cache agent 140, a RFO of cache lines in the page of data, and releasing ownership of each cache line in response to the cache line being transferred from the secondary memory to the main memory. In accordance with the cache coherency mechanism, cache lines of the page of data may be stored in cache of the cache agent 140. Alternatively, the tags and coherence state bits associated with those cache lines of the page of data may be stored. Further, in response to a request to access the second cache line of the page of data while the remaining portion of the page of data is being transferred at 650, a snoop request may be recognized for the second cache line, and returning the second cache line in response to the snoop request once the second cache line is transferred from the secondary memory. If the main memory cannot receive a page transfer, e.g., there are no free pages, one of the least used pages stored in the main memory may be determined based on the usage statistics described above, and the one of the least used pages may be released or written back into the secondary memory. Accordingly, the page of data may be transferred from the secondary memory to the main memory at the location of the released one of the least used pages.

A number of implementations have been described. Nevertheless, it will be understood that various modifications may be made without departing from the spirit and scope of the disclosure. For example, various forms of the flows shown above may be used, with steps re-ordered, added, or removed.

Implementations of the invention and all of the functional operations described in this specification can be implemented in digital electronic circuitry, firmware, or hardware, including the structures disclosed in this specification and their structural equivalents, or in combinations of one or more of them. Implementations of the invention can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

While this disclosure contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method comprising:
   determining, with a processor, whether an access bit is set for each page table entry of a page table based on a scan of the page table with a page table scanner, the access bit indicating whether a page associated with the page table entry was accessed in a last scan period;
   incrementing a count for each page in response to determining that the access bit for the page table entry associated with the page indicates that the page associated with the page table entry was not accessed in the last scan period, wherein the count for each page indicates the number of consecutive previous scan periods that the page was not accessed ending at the last scan period and the count for a particular page is greater than one;
   after determining, with the processor, whether the access bit is set for each page table entry, resetting the access bit;
   receiving a request to access, from a main memory, a first page of data;
   initiating a page fault based on determining that the first page of data is not stored in the main memory; and
   servicing the page fault using a direct memory access (DMA) engine,
   wherein servicing the page fault using a DMA engine comprises:
      in response to determining the main memory cannot receive a page transfer, determining a particular page based on the count for each page and releasing the particular page into the secondary memory, and transferring the first page of data from the secondary memory to the main memory at the location of the released particular page.

2. The method of claim 1, wherein the particular page is determined as one of the least used pages based on the count for each page.

3. The method of claim 1, wherein initiating the page fault comprises stalling execution of a thread while the page fault is serviced; and
   releasing the thread to access the main memory after the page fault is serviced.

4. The method of claim 1, wherein the count for each page is maintained by at least one of: a counter for each page stored in static random access memory, counting bloom filters, or a counter for each page stored in dynamic random access memory.

5. A system comprising:
   one or more processors; and
   a memory comprising a main memory and a secondary memory, the memory storing instructions that are operable, when executed, to cause the one or more processors to perform operations comprising:
      determining, with a processor, whether an access bit is set for each page table entry of a page table based on a scan of the page table with a page table scanner, the access bit indicating whether a page associated with the page table entry was accessed in a last scan period;
      incrementing a count for each page in response to determining that the access bit for the page table entry associated with the page indicates that the page associated with the page table entry was not accessed in the last scan period, wherein the count for each page indicates the number of consecutive previous scan periods that the page was not accessed ending at the last scan period and the count for a particular page is greater than one;
      after determining, with the processor, whether the access bit is set for each page table entry, resetting the access bit;
      receiving a request to access, from a main memory, a first page of data;
      initiating a page fault based on determining that the first page of data is not stored in the main memory; and
      servicing the page fault using a direct memory access (DMA) engine,
      wherein servicing the page fault using a DMA engine comprises:
         in response to determining the main memory cannot receive a page transfer, determining a particular page based on the count for each page and releasing the particular page into the secondary memory, and transferring the first page of data from the secondary memory to the main memory at the location of the released particular page.

6. The system of claim 5, wherein the particular page is determined as one of the least used pages based on the count for each page.

7. The system of claim 5, wherein initiating the page fault comprises stalling execution of a thread while the page fault is serviced; and
   releasing the thread to access the main memory after the page fault is serviced.

8. The system of claim 5, wherein the count for each page is maintained by at least one of: a counter for each page stored in static random access memory, counting bloom filters, or a counter for each page stored in dynamic random access memory.

9. A computer-implemented method comprising:
   determining whether an access bit is set for each page table entry of a page table based on a scan of the page table with at least one page table walker, the access bit indicating whether a page associated with the page table entry was accessed at a main memory in a last scan period;
   incrementing a primary count for each page in the main memory in response to determining that the access bit for the page table entry associated with the page indicates that the page associated with the page table entry was not accessed in the last scan period, wherein the count for each page indicates the number of consecutive previous scan periods that the page was not accessed ending at the last scan period and the count for a particular page is greater than one;
   after determining whether the access bit is set for each page table entry, resetting the access bit;
   determining whether a page in a secondary memory is accessed based on a home agent receiving a request to access the page in the secondary memory;
   incrementing a secondary count for each page in the secondary memory in response to determining that the page in the secondary memory is accessed based on the home agent receiving a request to access the page in the secondary memory;
   identifying a particular page in the secondary memory as frequently accessed based on the secondary count; and migrating the particular page identified as frequently accessed from the secondary memory to the main memory.

10. The method of claim 9, further comprising:
identifying a certain page in the main memory as infrequently accessed based on the primary count; and
migrating the certain page identified as infrequently accessed from the main memory to the secondary memory.

11. The method of claim 10, wherein migrating the certain page identified as infrequently accessed comprises invalidating the page table entry associated with the certain page, executing a translation lookaside buffer shootdown for any entries associated with the certain page, and transferring the certain page from the main memory to the secondary memory.

12. The method of claim 9, wherein each of the primary count for each page in the main memory and the secondary count for each page in the secondary memory is maintained by at least one of: a counter for each page stored in static random access memory, counting bloom filters, or a counter for each page stored in dynamic random access memory.

13. The method of claim 10, wherein identifying a certain page in the main memory as infrequently accessed based on the primary count comprises determining that an inter-access time for the certain page satisfies an inter-access time threshold.

14. The method of claim 13, wherein the certain page identified as infrequently accessed is migrated from the main memory to the secondary memory in response to determining that the inter-access time for the certain page satisfies the inter-access time threshold.

15. A system comprising:
one or more processors; and
a memory comprising a main memory and a secondary memory, the memory storing instructions that are operable, when executed, to cause the one or more processors to perform operations comprising:
determining whether an access bit is set for each page table entry of a page table based on a scan of the page table with at least one page table walker, the access bit indicating whether a page associated with the page table entry was accessed at a main memory in a last scan period;
incrementing a primary count for each page in the main memory in response to determining that the access bit for the page table entry associated with the page indicates that the page associated with the page table entry was not accessed in the last scan period, wherein the primary count for each page indicates the number of consecutive previous scan periods that the page was not accessed ending at the last scan period and the primary count for a particular page is greater than one;
after determining whether the access bit is set for each page table entry, resetting the access bit;
determining whether a page in a secondary memory is accessed based on a home agent receiving a request to access the page in the secondary memory;
incrementing a secondary count for each page in the secondary memory in response to determining that the page in the secondary memory is accessed based on the home agent receiving a request to access the page in the secondary memory;
identifying a particular page in the secondary memory as frequently accessed based on the secondary count; and
migrating the particular page identified as frequently accessed from the secondary memory to the main memory.

16. The system of claim 15, the operations further comprising:
identifying a certain page in the main memory as infrequently accessed based on the primary count; and
migrating the certain page identified as infrequently accessed from the main memory to the secondary memory.

17. The system of claim 16, wherein migrating the certain page identified as infrequently accessed comprises invalidating the page table entry associated with the certain page, executing a translation lookaside buffer shootdown for any entries associated with the certain page, and transferring the certain page from the main memory to the secondary memory.

18. The method of claim 1, comprising:
resetting the count for each page in response to determining that the access bit for the page table entry associated with the page indicates that the page associated with the page table entry was accessed in the last scan period.

19. The method of claim 18, wherein resetting the count for each page in response to determining that the access bit for the page table entry associated with the page indicates that the page associated with the page table entry was accessed in the last scan period comprises:
setting the count to zero for each page in response to determining that the access bit for the page table entry associated with the page indicates that the page associated with the page table entry was accessed in the last scan period.

20. The method of claim 1, wherein the count for each page stored in the main memory and each page stored in the secondary memory is stored in static random access memory.

* * * * *